(No Model.) 2 Sheets—Sheet 1.
W. R. MERCER.
CONVEYER FOR GRAIN HARVESTERS.
No. 457,827. Patented Aug. 18, 1891.
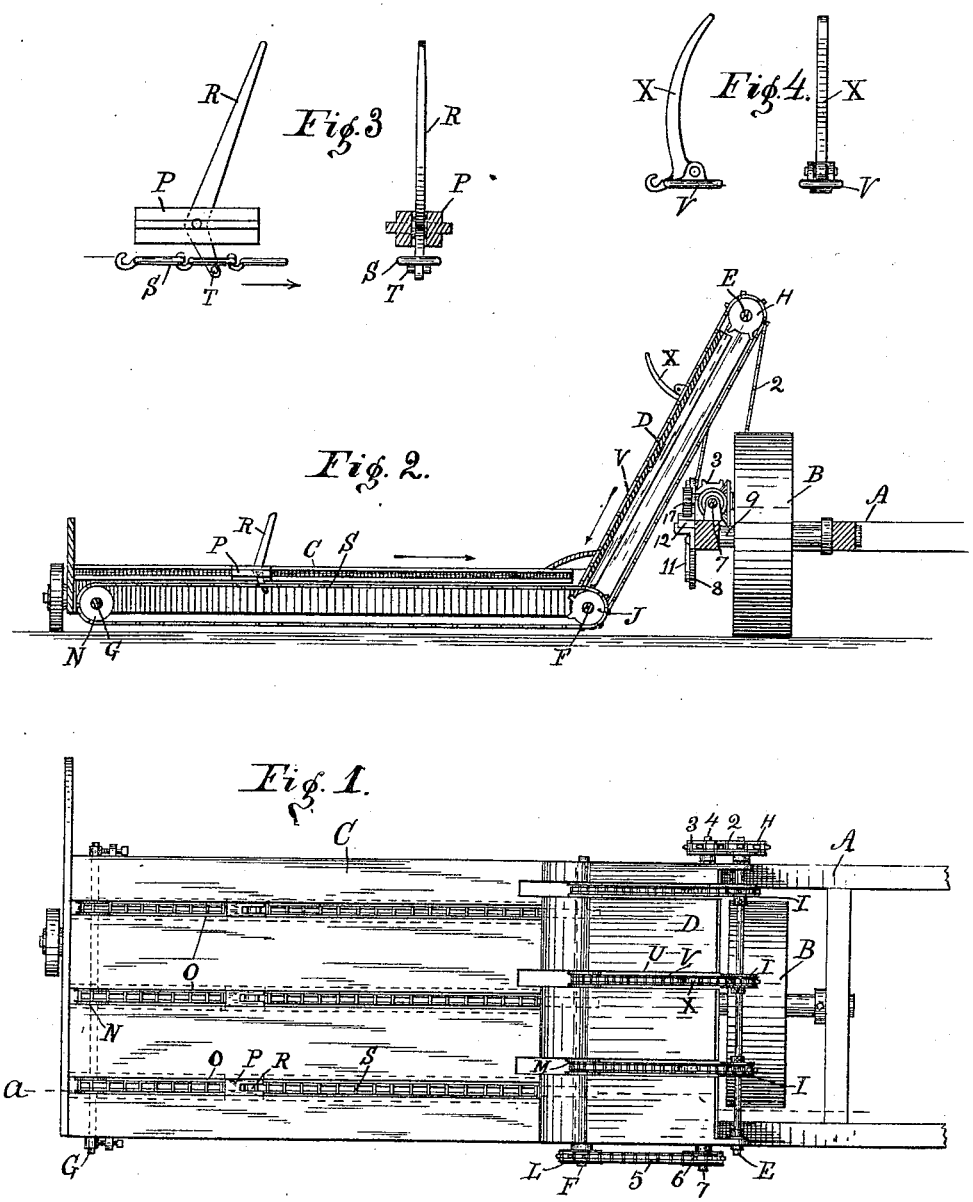
WITNESSES:
INVENTOR
William R. Mercer.
BY H. P. Hood
ATTORNEY (No Model.) 2 Sheets—Sheet 2.
W. R. MERCER.
CONVEYER FOR GRAIN HARVESTERS.

No. 457,827. Patented Aug. 18, 1891.

WITNESSES:
C. M. Hood.
John A. M. Cox

INVENTOR
William R. Mercer.
BY H. P. Hood.
ATTORNEY

UNITED STATES PATENT OFFICE.

WILLIAM R. MERCER, OF TERRE HAUTE, INDIANA.

CONVEYER FOR GRAIN-HARVESTERS.

SPECIFICATION forming part of Letters Patent No. 457,827, dated August 18, 1891.

Application filed March 16, 1891. Serial No. 385,189. (No model.)

*To all whom it may concern:*

Be it known that I, WILLIAM R. MERCER, a citizen of the United States, residing at Terre Haute, in the county of Vigo and State of Indiana, have invented a new and useful Improvement in Conveyers for Grain-Harvesters, of which the following is a specification.

My invention relates to an improved device for conveying and elevating the cut grain in a grain-harvester.

The object of my improvement is to substitute for the well-known woven endless-belt conveyer moving constantly in one direction, heretofore used in grain-harvesters, endless chain belts provided with folding teeth and having a reciprocating movement, all as hereinafter fully set forth.

The accompanying drawings illustrate my invention.

Figure 6:
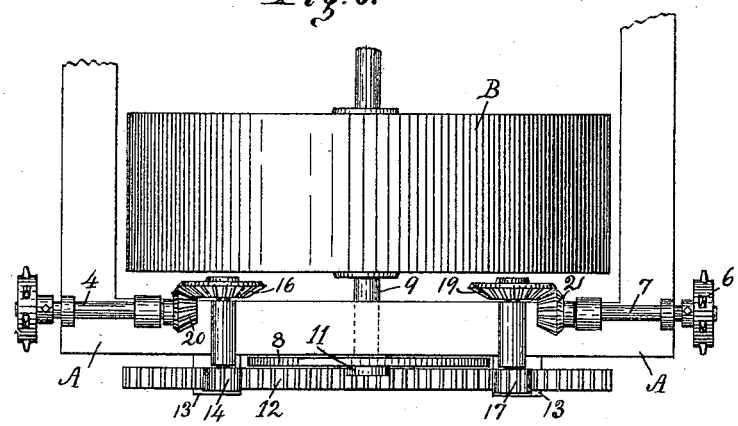
Figure 5:
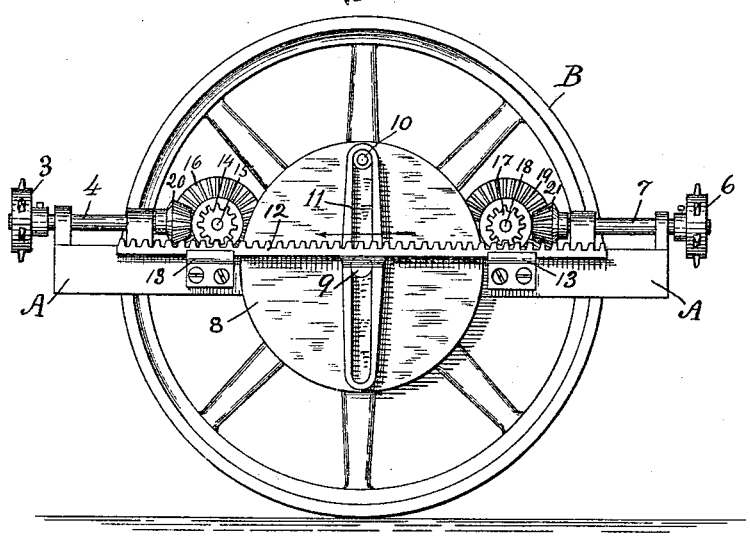

Figure 1 is a plan. Fig. 2 represents a longitudinal section at *a*, Fig. 1. Fig. 3 represents, on a larger scale, a side elevation and a front elevation of one of the folding teeth of the horizontal conveyer. Fig. 4 represents a side elevation and a front elevation of one of the folding teeth of the inclined conveyer. Fig. 5 represents a side elevation of the main carrying-wheel of the harvester and the mechanism for driving the conveyer-belts. Fig. 6 is a plan of the same.

In the drawings, A designates the main frame of the harvester; B, the main carrying-wheel; C, the horizontal platform on which the cut grain falls, and D the inclined way over which the grain passes on its way to the binder. Shafts E, F, and G are mounted, respectively, in suitable bearings at the top of the inclined way D at the junction of way D and platform C and at the outer end of platform C. Secured to shaft E, so as to turn therewith, is a driving sprocket-wheel H and a series of sprocket-wheels I I. A series of sprocket-wheels like J, Fig. 2, and a driving-wheel L are secured to shaft F, so as to turn therewith, and a series of idle-pulleys M are also mounted so as to turn loosely thereon. A series of loose pulleys N are mounted on shaft G.

Platform C is provided with a series of longitudinal slots O, having grooved edges, and mounted in each of said slots is a sliding block P, adapted to traverse the platform from end to end and having pivoted thereto, so as to swing thereon in a vertical plane, a tooth R. Arranged immediately beneath each of the slots O is a chain belt S, which passes over the sprocket-wheel J on shaft F and a loose pulley N on shaft G. The lower end of tooth R projects through one of the links of the belt S and is retained therein by a pin T, as clearly shown in Fig. 3. The inclined way D is also provided with a series of open slots U, beneath each of which a chain belt V is arranged to traverse over the sprocket-wheel I and idler M on shafts E and F. Each of the belts V is provided with a tooth X, which is hinged thereto, so as to turn upward thereon, as clearly shown in Fig. 4, and is arranged to project upward through the slot U.

The driving-wheel H on shaft E is connected by a chain belt 2 with a similar wheel 3, which is secured to a shaft 4, which is mounted in suitable bearings on the main frame of the harvester. The driving-wheel L on shaft F is connected by a chain belt 5 with a similar wheel 6, which is secured to a shaft 7, mounted in suitable bearings on the main frame opposite to shaft 4. Shafts 4 and 7 are connected with the main carrying-wheel B in such a manner that they revolve in opposite directions, and at each half-revolution of the carrying-wheel their direction of rotation is reversed by the following mechanism: A disk 8 is secured to the end of the main shaft 9, which turns with the carrying-wheel. Disk 8 carries a wrist-pin 10, which engages the slotted cross-head 11, rigidly secured to a horizontal rack-bar 12, which is mounted so as to slide longitudinally in brackets 13, secured to the main frame. The rack-bar 12 engages at one end a spur-pinion 14, which is mounted on a shaft 15, which has at its opposite end a bevel gear-wheel 16 and is mounted in a bearing on the main frame. The rack-bar engages at the other end a similar train of gearing, consisting of the spur-pinion 17, shaft 18, and bevel gear-wheel 19. Bevel gear-wheel 16 intermeshes with a bevel-pinion 20, secured to shaft 4, and wheel 19 intermeshes with a similar pinion 21, secured to shaft 7.

The operation of my device is as follows: The rotation of the carrying-wheel B during one-half of a revolution imparts a longitudinal movement to the rack-bar 12 in the direction indicated by the arrow in Fig. 5. This operates, through the pinions 14 and 17, shafts 15 and 18, bevel gear-wheels 16 and 19, pinions 20 and 21, shafts 4 and 7, sprocket-wheels 3 and 6, and chain belts 2 and 5, to drive the shafts E and F and the chain belts V and S connected therewith in the directions indicated by the arrows in Fig. 2. When belt S is moving in this direction, the chain, pulling on the lower end of the tooth R, operates to raise the tooth to the position shown and then to draw it and the sliding block P along the slot in platform C toward the inclined way D. At the same time the tooth X on belt V is drawn downward until it passes beneath the platform C, where it comes to rest at the same time that tooth R reaches the extent of its forward movement. The remaining half-revolution of the carrying-wheel operates to drive the rack-bar and its connected trains of gearing in the opposite direction. This movement of the belt S operates first to fold the tooth R down flush with the upper surface of the platform, and then to return it to the outer end of the platform. By these reciprocating movements of the conveyer-belts the cut grain falling on the platform is raked to the foot of the inclined way by the teeth R, and is then raised to the top of the inclined way while the teeth are returning to the outer end of the grain-platform by the teeth X on the belts V.

I claim as my invention—

1. In a grain-conveyer for harvesters, the combination of the slotted horizontal platform arranged to receive the cut grain, the slotted inclined way arranged adjacent thereto, the driving-shaft arranged at the junction of said platform and way, the driving-shaft arranged at the top of the inclined way, two series of chain belts mounted, respectively, on said shafts, one of which series is arranged to traverse the horizontal platform and the other of which is arranged to traverse the inclined way, said belts being each provided with a tooth which projects through the slot in the platform or way, the main carrying-wheel of the harvester, and intermediate connecting mechanism connecting said carrying-wheel and said driving-shafts, whereby the said shafts and the two series of belts mounted thereon are driven at the same time in opposite directions and the movement of both series is also reversed by the continuous forward movement of the carrying-wheel, as set forth.

2. In a grain-conveyer for harvesters, the combination of the horizontal platform arranged to receive the cut grain, the inclined way connected therewith, the two series of conveyer-belts arranged to traverse said platform and inclined way, respectively, the harvester-frame, the main carrying-wheel mounted on said frame, the disk secured to the shaft of said carrying-wheel so as to revolve therewith and provided with a wrist-pin, the rack-bar provided with a slotted cross-head and mounted so as to slide longitudinally on the harvester-frame and arranged to engage said wrist-pin, the train of gear-wheels, shafts, and belts connecting the rack-bar and the series of horizontal conveyer-belts, and the train of gear-wheels, shafts, and belts connecting the rack-bar and the series of inclined conveyer-belts, whereby the two series of conveyer-belts are driven in opposite directions at the same time by the continuous movement of the carrying-wheel in one direction, substantially as and for the purpose set forth.

WILLIAM R. MERCER.

Witnesses:
H. P. HOOD,
V. M. HOOD.